US007856455B2

(12) United States Patent
Martinez et al.

(10) Patent No.: US 7,856,455 B2
(45) Date of Patent: Dec. 21, 2010

(54) SYSTEM, METHOD AND PROGRAM PRODUCT FOR GENERATING TRIGGERS FOR A RELATIONAL DATABASE

(75) Inventors: Andrea C. Martinez, Poughkeepsie, NY (US); Charles Matula, Poughkeepsie, NY (US); David H. Starke, Poughkeepsie, NY (US); Gregory R. E. Wiley, Wappingers Falsl, NY (US)

(73) Assignee: International Business Machines Corporation, Armonk, NY (US)

( * ) Notice: Subject to any disclaimer, the term of this patent is extended or adjusted under 35 U.S.C. 154(b) by 961 days.

(21) Appl. No.: 11/365,075

(22) Filed: Mar. 1, 2006

(65) Prior Publication Data
US 2007/0208692 A1 Sep. 6, 2007

(51) Int. Cl.
*G06F 17/30* (2006.01)
(52) U.S. Cl. .................... 707/802; 707/804; 707/821
(58) Field of Classification Search .................. None
See application file for complete search history.

(56) References Cited

U.S. PATENT DOCUMENTS

| | | | | |
|---|---|---|---|---|
| 6,820,080 | B2 * | 11/2004 | Anderson et al. | 707/4 |
| 2003/0004952 | A1 | 1/2003 | Nixon et al. | 707/10 |
| 2004/0148474 | A1 | 7/2004 | Cuomo et al. | 711/144 |
| 2004/0236744 | A1 * | 11/2004 | Desai et al. | 707/8 |
| 2004/0267824 | A1 | 12/2004 | Pizzo et al. | 707/200 |
| 2005/0154695 | A1 * | 7/2005 | Gonzalez et al. | 707/1 |

OTHER PUBLICATIONS

Sybase Inc. ©, "Chapter 6 Using Referential Integrity Triggers", Sybase® PowerDesigner® Physical Data Model Getting Started Version 9.0; Nov. 2001; pp. 61-74.
Bhogal, Kulvir, Enforcing Business Logic Using DB2 Triggers, Java UDFs, and the JavaMail API, May 9, 2002 (pp. 1-5).

* cited by examiner

Primary Examiner—Ronald Laneau
Assistant Examiner—Tramar Harper
(74) Attorney, Agent, or Firm—Arthur J. Samodovitz

(57) ABSTRACT

System, method and program product for generating a trigger program that updates an entry in a dependent column in a table in response to a request to update a corresponding entry in a parent column in the table. A trigger program template is provided. The trigger program template includes program steps which indicate a type of update to an entry in an unspecified parent column which triggers an update to a corresponding entry in an unspecified dependent column. The trigger program template also indicates a type of the unspecified dependent column to update upon the update to the entry in the unspecified parent column. The table is automatically scanned to identify one or more dependent columns of the type. In response to identification of the one or more dependent columns of the type, a name of a parent column, corresponding to the one or more dependent columns, is inserted in the trigger program template steps to identify the corresponding parent column as the unspecified parent column and identify the one or more dependent columns as the unspecified dependent columns. Names of the one or more dependent columns comprise the name of the specified parent column and respective suffixes indicating the types of the dependent columns.

12 Claims, 2 Drawing Sheets

SYSTEM, METHOD AND PROGRAM PRODUCT FOR GENERATING TRIGGERS FOR A RELATIONAL DATABASE

FIELD OF THE INVENTION

The present invention relates generally to computer systems, and more specifically to managing relational databases.

BACKGROUND OF THE INVENTION

Relational databases are well known today. They typically comprise tables organized into rows and columns. The first column lists "reference" items for respective rows, for example, names of specific customers in a table containing customer information. The "top" row identifies the type of data or "content item" for each row entry in the column, for example, the date of last update of the customer name, a hash value for the customer name and the customer's zip code, whether the customer name has been updated since it was first inserted, etc. As another example, the first column lists the names of employees as reference items in an table containing employee information, and the top row lists salary and last date of update of the salary as content items. The "inner" fields of both table include the actual data corresponding to each combination of reference item and content item. Specific data fields in each tables are accessed by referencing the corresponding row containing the reference item and the column containing the content item of interest.

Structure Query Language ("SQL") is a standard programming language for program code that writes data into (i.e. inserting, adding or deleting data) the data fields, and reads data from the data fields (and also selects a data field or column, or finds a data field or column). SQL is also used to add, delete or change a reference item in the first column or add, delete or change a content item in the top row. Although SQL is both an ANSI and ISO standard, many database programs include nonstandard extensions to the standard SQL commands.

Some of the columns of a table in a relational database can be interrelated as a "family" or a "grouping". In the example of the first table described above, when a row for a new customer is inserted or a customer name in an existing row is updated, the date of last update of the customer name, and hash value of the customer name and zip code should also be updated. In this first example, the customer name is a "parent" column, the date of last update is a dependent column and the hash value is a dependent column, all in the same family. In the example of the second table described above, when an employee is hired, the employee's salary will change (to the starting salary) as well as the date of update of the salary. In this second example, the name of the employee is a "parent" column, the salary is a "dependent" column and the date of last update is a dependent column, all in the same family.

The general term for an action(s) to perform, such as to update a dependent column, in response to a change to a parent column of the same family is "trigger program" or "trigger" for short. The trigger can automatically cause updates to the dependent columns, automatically generate or transform values for inserted or updated rows in the dependent table, or invoke functions to issue alerts in response to changes to the parent table. The trigger can be executed, in response to a request to change a parent column, shortly before an insert, update or deletion to the parent column or shortly after an insert, update or deletion to the parent column. A trigger can be written in SQL.

It was known to write a SQL program function that automatically updates a dependent column when there is a request to update its parent column. While this is effective to automatically update the dependent column, it was burdensome for a person to write this trigger program function and errors were made in the writing of the trigger program function, especially when there were a large number of parent and dependent columns and a large number of trigger programs to write.

Accordingly, an object of the present invention is to facilitate the process of generating a trigger program.

SUMMARY

The present invention resides in a system, method and program product for generating a trigger program that updates an entry in a dependent column in a table in response to a request to update a corresponding entry in a parent column in the table. A trigger program template is provided. The trigger program template includes program steps which indicate a type of update to an entry in an unspecified parent column which triggers an update to a corresponding entry in an unspecified dependent column. The trigger program template also indicates a type of the unspecified dependent column to update upon the update to the entry in the unspecified parent column. The table is automatically scanned to identify one or more dependent columns of the type. In response to identification of the one or more dependent columns of the type, a name of a parent column, corresponding to the one or more dependent columns, is inserted in the trigger program template steps to identify the corresponding parent column as the unspecified parent column and identify the one or more dependent columns as the unspecified dependent columns.

According to a feature of the present invention, names of the one or more dependent columns comprise the name of the specified parent column and respective suffixes indicating the types of the dependent columns.

According to another feature of the present invention, one of the dependent columns records time stamps for when the update to the respective entries in the parent column were made.

DETAILED DESCRIPTION OF THE PREFERRED EMBODIMENTS

Figures 1, 2:
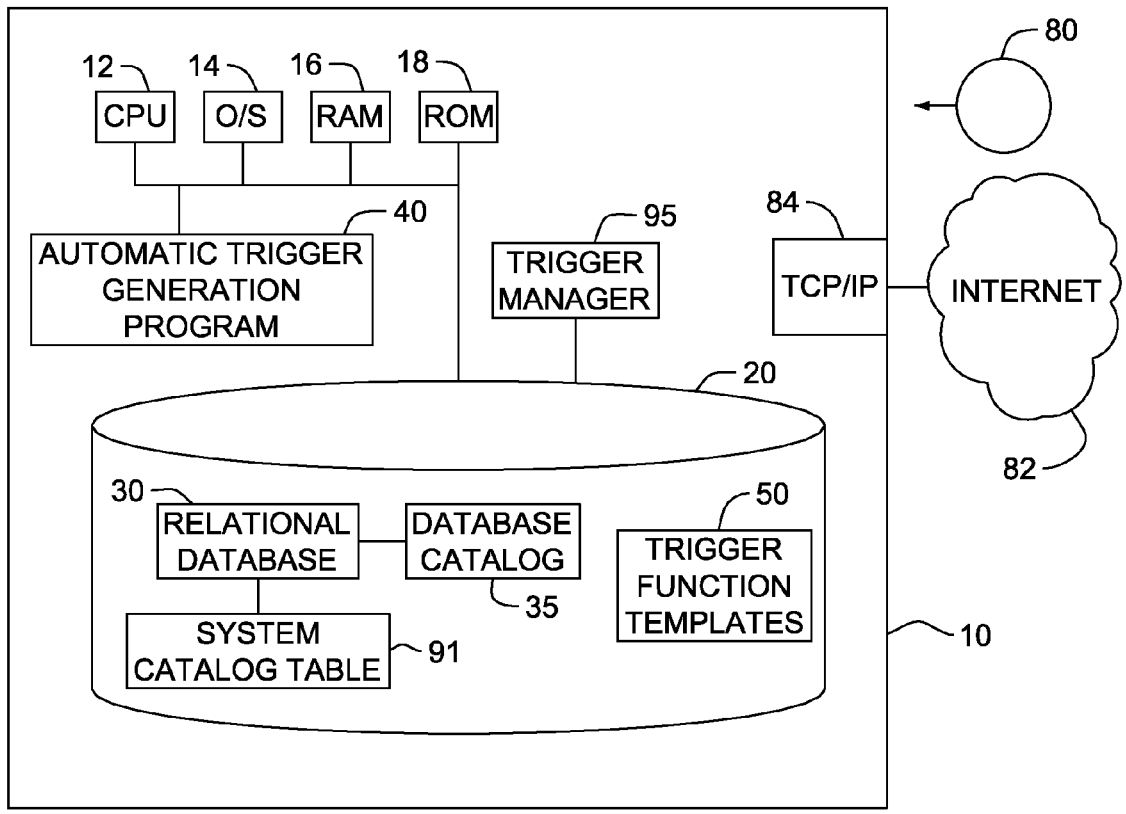
FIG. 1 is a block diagram of a computer in which the present invention, including a relational database and an automatic trigger generation program, is incorporated.
FIG. 2 is a flow chart of the relational database within the computer of FIG. 1.

The present invention will now be described in detail with reference to the figures. FIG. 1 illustrates a computer generally designated 10 in which the present invention is incorporated. Computer 10 includes a processor 12, operating system 14, RAM 16, ROM 18 and storage 20, according to the prior art. Storage 20 includes a relational database 30 and a database 50 of predefined, trigger function templates, in accordance with the present invention. Relational database 30 includes a multiplicity of relational tables. Each of the relational tables includes one or more "parent" columns and one or more corresponding "dependent" columns for each parent column. FIG. 2 illustrates one such table with a parent column table 32 and two dependent tables 34 and 36, although often there are many parent and dependent columns in a single table. In accordance with the present invention, there is a naming convention used for the parent column and dependent columns in the same family. Each of the dependent columns has a name whose first part matches all or part of the name of its parent column, and whose second part uniquely identifies the dependent column within the family. The name of each parent column is unique within its table, and the combination of first and second parts of the name of each dependent column is unique within the table. Each of the predefined trigger function templates includes data which identifies:

A) name of the trigger function,
B) type of trigger function (for example, "Before Insert Trigger", "Before Update Trigger", "Before Delete Trigger", "After Insert Trigger", "After Update Trigger", or "After Delete Trigger); this indicates when the trigger function is to be executed relative to changes to the parent column in response to a request, to update the parent column in the same family, and
C) one or more suffixes which identify dependent columns (for example, "_TS" for time stamp and "_CS" for customer status, i.e. updated or not updated), to be updated in response to a request to update the parent column in the same family.

Each of the predefined trigger function templates in database 50 also includes the trigger function program template for forming the actual trigger function program. Some steps of the trigger function program template include a variable; the name of the parent column of the same family is substituted for the variable to form the actual trigger function program from the template.

The following is an example of a predefined trigger function template in database 50:

```
DATA:
TRIG_NAME           BIT_<TABLENAME>
TRIG_TYPE:          BEFORE_INSERT
TRIG_SUFFIX:        _TS
TRIG_SUFFIX:        _CS
TRIG_FUNCTION:
IF (NEWROW.* NOT EQUAL TO OLDROW.*) OR
(NEWROW.* IS NULL AND OLDROW.* IS NOT NULL) OR
(NEWROW.* IS NOT NULL AND OLDROW.* IS NULL) THEN
   SET NEWROW.*_TS = CURRENT TIMESTAMP;
   SET NEWROW.*_CS = "UPDATED";
WHERE * = CUSTOMER_LNAME.
```

According to this example, in response to a request to add or change a customer's last name in a parent, reference column "CUSTOMER_LNAME", the time stamp row in the _TS dependent, item column is updated with the current time and the customer status row in the _CS dependent, item column is updated to record "updated" as the status of the customer name. Because the data portion of the trigger function template indicates "BEFORE INSERT" type of trigger, the time stamp and customer status are updated in the table after the request is made to update the customer's last name but shortly before the customer's last name is updated in the table.

Also in accordance with the present invention, computer 10 includes an automatic trigger generation program 40 which automatically generates trigger programs based on the trigger program function templates described above. Program 40 generates the trigger programs by automatically identifying the parent columns, i.e. those with a predefined or less number of characters and for which there are other columns having the same name and an additional suffix, based on the naming convention. After identifying the parent columns, program 40 fills-in the name of each parent column in the trigger function template for the variable, and then copies the resultant trigger function program to storage for subsequent usage.

During operation, the trigger function program will perform its trigger function on data entries of the dependent columns in response to activity in the respective row of the parent column. Other types of trigger functions can invoke functions to issue alerts in response to changes in the parent column. Often times, a single trigger function template can be used for multiple parent columns and dependent columns, those dependent columns having the same suffix as listed in the trigger function program. Consequently, when new tables are added to database 30 or new columns are added to existing tables, often times, program 40 can use an existing trigger function template in database 50 to automatically generate the trigger function program. There is no need to manually write the trigger function program or even manually identify the dependent columns for each parent column.

Figure 3:
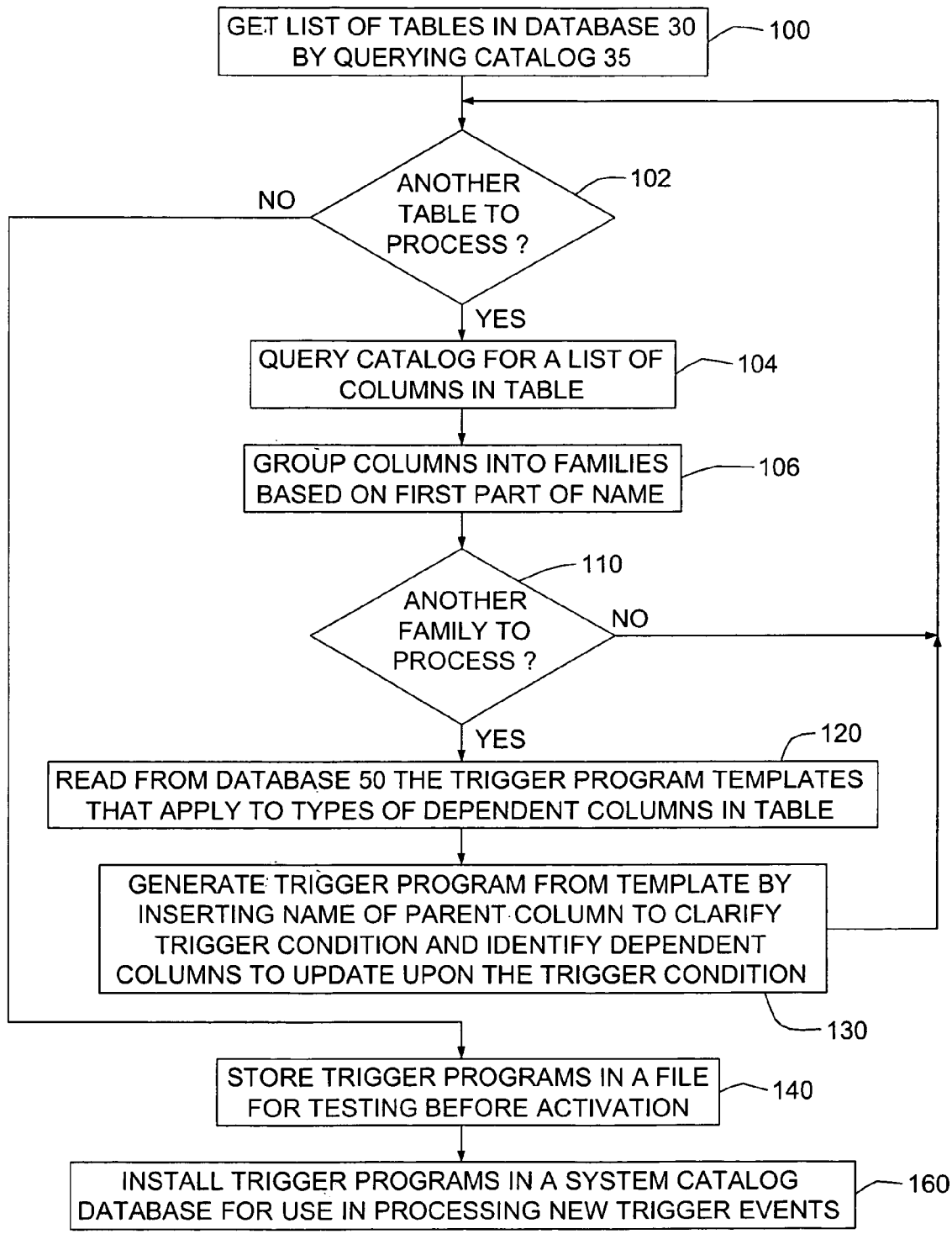
FIG. 3 is a flow chart of the automatic trigger generation program of FIG. 1.

FIG. 3 illustrates program 40 in more detail. In step 100, program 40 obtains a list of names of tables in database 30 by querying a database system catalog 35. Assuming there is at least one table in the database 30 (decision 102, yes branch), for the first table (in the first iteration or next table during the next iteration), program 40 queries the catalog for a list of the columns in the table (step 104). Next, program 40 identifies which of the columns have the same column names indicated by the first predefined number of characters (step 106). These are the parent and dependent columns of each "family". Next, program 40 identifies the parent column and dependent column(s) in each family, distinguishing the parent column by the absence of a suffix after the first predefined number of characters, and the dependent column(s) by the presence of a suffix after the first predefined number of characters. Assuming there is a least one family in the table (decision 110, yes branch), program 40 identifies each trigger function template in database 50 which has all its suffixes (such as _TS and _CS) match suffixes of dependent columns in the current family (step 120). For each such trigger function template, program 40 generates a trigger function program by substituting the prefix name of the parent family, i.e. the name of the parent column, for the variable in the trigger function template (step 130). In the foregoing example of a trigger function template, after insertion of the parent column name "CUSTOMER_LNAME" for the variable, the following trigger function program results:

```
IF (NEWROW.CUSTOMER_LNAME NOT EQUAL
   OLDROW.CUSTOMER_LNAME) OR
(NEWROW.CUSTOMER_LNAME IS NULL AND
   OLDROW.CUSTOMER_LNAME IS NOT NULL) OR
(NEWROW.CUSTOMER_LNAME IS NOT NULL AND
   OLDROW.CUSTOMER_LNAME IS NULL) THEN
   SET NEWROW.CUSTOMER_LNAME_TS = CURRENT
      TIMESTAMP;
   SET NEWROW.CUSTOMER_LNAME_CS = 'UPDATED'.
```

After generating the trigger function program for this family, program 40 loops back to decision 110, yes branch, step 120 and step 130 to generate the trigger function program for the next family, if any, in the table. After all the families in this table have been processed (decision 110, no branch), i.e. the trigger function programs have been generated for all the families in this table, program 40 loops back to decision 102 to determine if there is another or next table yet to be processed. If so (decision 102, yes branch), program 40 proceeds to steps 104, 106, 110, 120 and 130 to generate the trigger function programs for the families in this other table. After all the trigger function programs are generated for all of the families in all of the tables in database 30, program 40 copies all the trigger programs to a file to allow an administrator to view or test them before activating them (step 140). Next, program 40 completes creation of the trigger function programs by executing a known create trigger SQL program which installs the trigger function programs into a system catalog table 91 (step 160). Consequently, when new trigger events occur, a trigger manager 95 (which is typically software such as found in IBM DB/2 software) compares them to the trigger conditions of each trigger program in the system catalog table 91. If they match the trigger conditions of a trigger program, then the trigger manager 95 initiates the triggers to process the trigger event and perform the action indicated by the trigger, such as updating the time stamp or customer status, in the foregoing example.

Program 40 embodied in a program product can be loaded into computer 10 from a computer readable medium 80 such as a magnetic disk or tape, CD, DVD, etc. or downloaded from the Internet 82 via a TCP/IP adapter card 84.

Program 95 can be loaded into computer 10 from computer readable media 80 or downloaded from the Internet 82 via TCP/IP adapter card 84.

Based on the foregoing, system, method and program product for semi-automatically generating triggers have been disclosed. However, numerous modifications and substitutions can be made without deviating from the scope of the present invention. Therefore, the present invention has been disclosed by way of illustration and not limitation, and reference should be made to the following claims to determine the scope of the present invention.

What is claimed:

1. A method for automatically generating a trigger program that updates an entry in a dependent column in a table in response to a request to update a corresponding entry in a parent column in said table, said method comprising the steps of:

a computer utilizing a naming convention for columns in said table, wherein a parent column of said columns is grouped into a family based on a first part of a name, and wherein a dependent column to be updated in response to a request to update said parent column contains part or all of said first part of said name of said parent column and contains a second part indicating a type of said dependent column;

the computer providing a predefined trigger program template for automatically generating said trigger program, said predefined trigger program template including trigger program template steps which indicate a type of update to an entry in an unspecified parent column which triggers an update to a corresponding entry in an unspecified dependent column, said predefined trigger program template also indicating a type of said unspecified dependent column to update upon said update to said entry in said unspecified parent column; and the computer automatically scanning said table to identify one or more dependent columns of said type matching said type of said unspecified dependent column; and in response to identification of said one or more dependent columns of said type, automatically inserting a name of a corresponding parent column, corresponding to said one or more dependent columns, in said trigger program template steps to identify said corresponding parent column as said unspecified parent column and to identify a dependent column of said one or more dependent columns as said unspecified dependent column to be updated.

2. A method as set forth in claim 1, wherein names of said one or more dependent columns comprise part or all of said name of said corresponding parent column and respective indications of types of said one or more dependent columns.

3. A method as set forth in claim 1, wherein names of said one or more dependent columns comprise said name of said corresponding parent column and respective suffixes indicating said types of said one or more dependent columns.

4. A method as set forth in claim 1, wherein one of said one or more dependent columns records time stamps for when said update to said respective entries in said corresponding parent column were made.

5. A computer system for automatically generating a trigger program that updates an entry in a dependent column in a table in response to a request to update a corresponding entry in a parent column in said table, said system comprising:

means for utilizing a naming convention for columns in said table, wherein a parent column of said columns is grouped into a family based on a first part of a name, and wherein a dependent column to be updated in response to a request to update said parent column contains part or all of said first part of said name of said parent column and contains a second part indicating a type of said dependent column;

means for providing a trigger program template for automatically generating a trigger program, said trigger program template including program steps which indicate a type of update to an entry in an unspecified parent column which triggers an update to a corresponding entry in an unspecified dependent column, said trigger program template also indicating a type of said unspecified dependent column to update upon said update to said entry in said unspecified parent column; and means for automatically scanning said table to identify one or more dependent columns of said type matching said type of said unspecified dependent column; and in response to identification of said one or more dependent columns of said type, automatically inserting a name of a corresponding parent column, corresponding to said one or more dependent columns, in said trigger program template steps to identify said corresponding parent column as said unspecified parent column and to identify a dependent column of said one or more dependent columns as said unspecified dependent columns to be updated.

6. A system as set forth in claim 5, wherein names of said one or more dependent columns comprise part or all of said name of said corresponding parent column and respective indications of types of said one or more dependent columns.

7. A system as set forth in claim 5, wherein names of said one or more dependent columns comprise said name of said corresponding parent column and respective suffixes indicating said types of said one or more dependent columns.

8. A system as set forth in claim 5, wherein one of said one or more dependent columns records time stamps for when said update to said respective entries in said corresponding parent column were made.

9. A computer program product for automatically generating a trigger program that updates an entry in a dependent column in a table in response to a request to update a corresponding entry in a parent column in said table, said computer program product comprising:

a computer readable storage device;

first program instructions to utilize a naming convention for columns in said table, wherein a parent column of said columns is grouped into a family based on a first part of a name, and wherein a dependent column to be updated in response to a request to update said parent column contains part or all of said first part of said name of said parent column and contains a second part indicating a type of said dependent column;

second program instructions to provide a trigger program template for automatically generating said trigger program, said trigger program template including trigger program template steps which indicate a type of update to an entry in an unspecified parent column which triggers an update to a corresponding entry in an unspecified dependent column, said trigger program template also indicating a type of said unspecified dependent column to update upon said update to said entry in said unspecified parent column; and third program instructions to automatically scan said table to identify one or more dependent columns of said type matching said type of said unspecified dependent column; and in response to identification of said one or more dependent columns of said type, automatically inserting a name of a corresponding parent column, corresponding to said one or more dependent columns, in said trigger program template steps to identify said corresponding parent column as said unspecified parent column and to identify a dependent column of said one or more dependent columns as said unspecified dependent column to be updated; and wherein said first, second and third program instructions are stored on said storage device in functional form.

10. A computer program product as set forth in claim 9, wherein names of said one or more dependent columns comprise part or all of said name of said corresponding parent column and respective indications of types of said one or more dependent columns.

11. A computer program product as set forth in claim 9, wherein names of said one or more dependent columns comprise said name of said corresponding parent column and respective suffixes indicating said types of said one or more dependent columns.

12. A computer program product as set forth in claim 9, wherein one of said one or more dependent columns records time stamps for when said update to said respective entries in said corresponding parent column were made.

* * * * *